United States Patent
Park et al.

(10) Patent No.: US 11,386,637 B2
(45) Date of Patent: Jul. 12, 2022

(54) METHOD AND APPARATUS FOR DETECTING OBJECT

(71) Applicant: Samsung Electronics Co., Ltd., Suwon-si (KR)

(72) Inventors: Seungin Park, Yongin-si (KR); Lin Ma, Beijing (CN); Weiming Li, Beijing (CN); Yang Liu, Beijing (CN); Hao Wang, Beijing (CN); Hyong Euk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 21 days.

(21) Appl. No.: 16/739,325

(22) Filed: Jan. 10, 2020

(65) Prior Publication Data

US 2021/0019544 A1 Jan. 21, 2021

(30) Foreign Application Priority Data

Jul. 16, 2019 (KR) .................. 10-2019-0085620

(51) Int. Cl.
*G06V 10/00* (2022.01)
*G06V 10/25* (2022.01)
*G06K 9/62* (2022.01)
*G06N 3/04* (2006.01)
*G06V 10/44* (2022.01)

(52) U.S. Cl.
CPC ........... *G06V 10/25* (2022.01); *G06K 9/6256* (2013.01); *G06N 3/0454* (2013.01); *G06V 10/44* (2022.01); *G06V 2201/07* (2022.01)

(58) Field of Classification Search
CPC .. G06K 9/3233; G06K 9/4604; G06K 9/6256; G06K 2209/21; G06N 3/0454
See application file for complete search history.

(56) References Cited

U.S. PATENT DOCUMENTS 10,157,331 B1 12/2018 Tang et al.
2010/0272366 A1 10/2010 Meng et al.
(Continued)

FOREIGN PATENT DOCUMENTS

CN 108288075 A 7/2018
CN 109165585 A 1/2019
(Continued)

OTHER PUBLICATIONS

Gao et al. Dynamic Zoom-in Network for Fast Object Detection in Large Images, arXiv 1711.05187v2 Mar. 27, 2018.*
(Continued)

*Primary Examiner* — Nancy Bitar
*Assistant Examiner* — Xiao Liu
(74) *Attorney, Agent, or Firm* — NSIP Law

(57) ABSTRACT

An object detection method includes setting a first window region and a second window region larger than the first window region that correspond to partial regions of different sizes in an input image, downsampling the second window region to generate a resized second window region, detecting a first object candidate from the first window region and a second object candidate from the resized second window region, and detecting an object included in the input image based on one or both of the first object candidate and the second object candidate.

34 Claims, 10 Drawing Sheets

(56) References Cited

U.S. PATENT DOCUMENTS

| | | | |
|---|---|---|---|
| 2017/0011281 A1* | 1/2017 | Dijkman | G06K 9/66 |
| 2017/0262723 A1* | 9/2017 | Kozitsky | G06K 9/6267 |
| 2018/0060648 A1* | 3/2018 | Yoo | G06K 9/00899 |
| 2018/0075628 A1 | 3/2018 | Teare | |
| 2018/0121762 A1 | 5/2018 | Han et al. | |
| 2018/0211117 A1 | 7/2018 | Ratti | |
| 2019/0213406 A1* | 7/2019 | Porikli | G06K 9/00355 |
| 2019/0221191 A1* | 7/2019 | Ch | G06F 3/012 |
| 2020/0151448 A1* | 5/2020 | Lin | G06K 9/6256 |
| 2020/0175326 A1* | 6/2020 | Shen | G05D 1/0088 |

FOREIGN PATENT DOCUMENTS

| | | |
|---|---|---|
| CN | 109409252 A | 3/2019 |
| CN | 109409443 A | 3/2019 |
| CN | 109493609 A | 3/2019 |
| CN | 109508710 A | 3/2019 |
| EP | 3 471 021 A1 | 4/2019 |
| JP | 2018112890 A * | 7/2018 |
| KR | 10-1350526 B1 | 1/2014 |
| KR | 10-2017-0028591 A | 3/2017 |

OTHER PUBLICATIONS

Liu et al, Learning pairwise relationship for multi-object detection in crowded scenes, arXiv:1901.03796v1 Jan. 12, 2019.*
Lin et al., "Feature Pyramid Networks for Object Detection," Facebook AI Research (FAIR), Apr. 19, 2017, 10 pages.
Liu et al., "SSD: Single Shot MultiBox Detector," ECCV2016, Dec. 29, 2016, 17 pages.
Redmon et al., "You Only Look Once: Unified, Real-Time Object Detection," CVPR 2016, 10 pages.
EESR dated Dec. 10, 2020 issued in counterpart European Patent Application No. 20178080.6 (12 pages in English).
Gao, Mingfei, et al. "Dynamic Zoom-in Network for Fast Object Detection in Large Images." *Proceedings of the IEEE Conference on Computer Vision and Pattern Recognition.* 2018 (10 pages in English).

* cited by examiner

METHOD AND APPARATUS FOR DETECTING OBJECT

CROSS-REFERENCE TO RELATED APPLICATIONS

This application claims the benefit under 35 USC § 119(a) of Korean Patent Application No. 10-2019-0085620 filed on Jul. 16, 2019, in the Korean Intellectual Property Office, the entire disclosure of which is incorporated herein by reference for all purposes.

BACKGROUND

1. Field

The following description relates to a method and apparatus for detecting an object.

2. Description of Related Art

An augmented reality (AR) applied image that may show information and/or images needed by a user may help the user to accurately determine a situation and improve an ability to act. There are various object recognition and/or detection methods that may be used to identify information and/or images needed by a user.

For example, there is a method used to detect an object from a single feature map. Through this method, accuracy of a result of the detecting may vary greatly based on a size of an object in an image. As another example, there is a method to detect an object by applying different convolution layers to generate multi-scale feature maps based on size variability of a target object. However, in such example, a feature map of each scale may need to be generated irrespective of a size of a target object to be detected, and thus a computational burden may increase.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an object detection method includes setting a first window region and a second window region larger than the first window region that correspond to partial regions of different sizes in an input image, downsampling the second window region to generate a resized second window region, detecting a first object candidate from the first window region and a second object candidate from the resized second window region, and detecting an object included in the input image based on one or both of the first object candidate and the second object candidate.

The setting of the first window region and the second window region may include setting the first window region and the second window region based on an attention point of a user in the input image.

The object detection method may include determining the attention point based on one or more of gaze information of the user, voice information of the user, and a gesture performed by the user.

The setting of the first window region and the second window region may include setting the first window region of a first size based on the attention point, and setting the second window region of a second size greater than the first size based on the attention point.

The downsampling of the second window region may include adjusting the second size of the second window region to be equal to the first size of the first window region by downsampling an image corresponding to the second window region.

The first size of the first window region and the second size of the second window region may be determined based on one or more of a type of the object to be detected from the input image, a field of view (FoV), and camera distance information corresponding to the input image.

The first window region may be to recognize an object having a size less than a preset size, and the first image extracted from the first window region may have a same resolution as the input image.

The second window region may be to recognize an object having a size greater than a preset size, and the second image extracted from the resized second window region may have a resolution lower than a resolution of the input image.

The detecting of the object may include detecting the object included in the input image from one or both of the first object candidate and the second object candidate using non-maximum suppression (NMS).

The detecting of the first object candidate and the second object candidate may include initiating a detection of the first object candidate based on whether the second object candidate is detected from the resized second window region.

The detecting of the object may include adjusting a location of the first window region based on a location of the second object candidate, detecting the first object candidate from the adjusted location of the first window region, and detecting the object included in the input image from the second object candidate and the first object candidate detected from the adjusted location.

The adjusting of the location of the first window region may include estimating a location in the input image at which the object is estimated to be located based on the location of the second object candidate, and adjusting the location of the first window region using the estimated location.

The detecting of the first object candidate and the second object candidate may include detecting the second object candidate by applying the second image extracted from the resized second window region to a neural network, and detecting the first object candidate by applying the first image extracted from the first window region to the neural network.

The detecting of the first object candidate and the second object candidate may include determining whether the second object candidate is detected from a second image extracted from the resized second window region by applying the second image to a second neural network, and determining whether to apply a first image extracted from the first window region to a first neural network to detect the first object candidate based on whether the second object candidate is detected from the second image.

The object detection method may include in a case in which the second object candidate is detected from the second image, not applying the first image to the first neural network.

The object detection method may include in a case in which the second object candidate is not detected from the second image, detecting the first object candidate by applying the first image to the first neural network.

The detecting of the first object candidate may include estimating a location in the second image at which the object is estimated to be located, adjusting a location of the first window region using the estimated location, extracting the first image from the adjusted location of the first window region, and detecting the first object candidate by applying the first image extracted from the adjusted location to the first neural network.

The object detection method may further include obtaining the input image and the attention point corresponding to the input image.

In another general aspect, an object detection apparatus includes a communication interface configured to obtain an input image, and a processor configured to set a first window region and a second window region larger than the first window region that correspond to partial regions of different sizes in the input image, downsample the second window region to generate resized second window region, detect a first object candidate from the first window region and a second object candidate from the resized second window region, and detect an object included in the input image based on one or more of the first object candidate and the second object candidate.

The processor may set the first window region and the second window region based on an attention point of a user in the input image.

The attention point may be determined based on one or more of gaze information of the user, voice information of the user, and a gesture performed by the user.

The processor may set the first window region of a first size based on the attention point, and set the second window region of a second size greater than the first size based on the attention point.

The processor may adjust the second size of the second window region to be equal to the first size of the first window region by downsampling an image corresponding to the second window region.

The first size of the first window region and the second size of the second window region may be determined based on one or more of a type of the object to be detected from the input image, an FoV, and camera distance information corresponding to the input image.

The first window region may be to recognize an object having a size less than a preset size, and the first image extracted from the first window region may have a same resolution as the input image.

The second window region may be to recognize an object having a size greater than a preset size, and the second image extracted from the resized second window region may have a resolution lower than a resolution of the input image.

The processor may detect the object included in the input image from one or both of the first object candidate or the second object candidate using NMS.

The processor may detect the first object candidate based on whether the second object candidate is detected from the resized second window region.

The processor may adjust a location of the first window region based on a location of the second object candidate, detect the first object candidate from the adjusted location of the first window region, and detect the object included in the input image from the second object candidate and the first object candidate detected from the adjusted location.

The processor may estimate a location in the input image at which the object is estimated to be located based on the location of the second object candidate, and adjust the location of the first window region using the estimated location.

The processor may determine whether the second object candidate is detected from a second image extracted from the resized second window region by applying the second image to a second neural network, and determine whether to apply a first image extracted from the first window region to a first neural network to detect the first object candidate based on whether the second object candidate is detected from the second image.

The processor may in a case in which the second object candidate is detected from the second image, not apply the first image to the first neural network.

The processor may in a case in which the second object candidate is not detected from the second image, detect the first object candidate by applying the first image to the first neural network.

The processor may estimate a location in the second image at which the object is estimated to be located, adjust a location of the first window region using the estimated location, extract the first image from the adjusted location of the first window region, and detect the first object candidate by applying the first image extracted from the adjusted location to the first neural network.

The communication interface may obtain the attention point corresponding to the input image.

In another general aspect, an object detection apparatus includes a communication interface configured to obtain an input image, and a processor configured to set a first window region of a first size and a second window region of a second size larger than the first size corresponding to partial regions of the input image; generate a resized second window region from the second window region; determine whether a second object candidate is detected from a second image extracted from the resized second window region by applying the second image to a second neural network; determine whether to apply a first image extracted from the first window region to a first neural network to detect a first object candidate based on whether the second object candidate is detected from the second image; and detect an object included in the input image based on one or both of the first object candidate and the second object candidate.

Other features and aspects will be apparent from the following detailed description, the drawings, and the claims.

Figure 1:
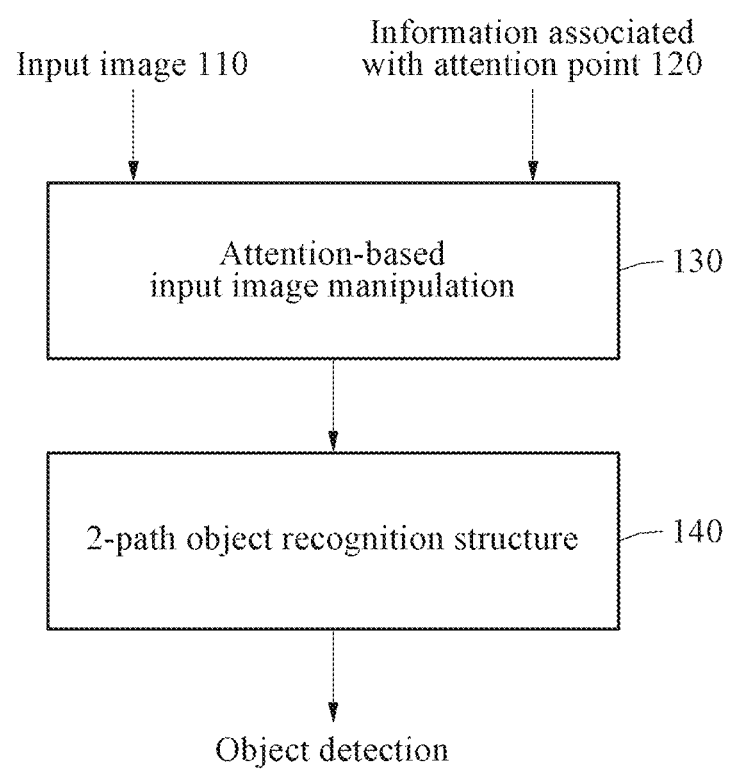
FIG. 1 is a diagram illustrating an example of object detection.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment (e.g., as to what an example or embodiment may include or implement) means that at least one example or embodiment exists where such a feature is included or implemented, while all examples are not limited thereto.

Also, in the description of example embodiments, detailed description of structures or functions that are thereby known after an understanding of the disclosure of the present application will be omitted when it is deemed that such description will cause ambiguous interpretation of the example embodiments.

Hereinafter, examples will be described in detail with reference to the accompanying drawings, and like reference numerals in the drawings refer to like elements throughout.

FIG. 1 is a diagram illustrating an example of object detection. What needs to be considered to determine information and/or images needed by a user may not include all sets of information in a visible area of the user, but only a certain region in the visible area becomes a target and/or information of interest to the user among all the sets of information. To define the target and/or information of interest, a region or a target in the visible area to which the user pays attention may need to be selected. For example, gaze information associated with a gaze of the user may be used, as gaze information is one of the fastest cognitive actions closely related to the attention from the user among various sensory inputs. Using the gaze information may enable the selection of the target and/or information of interest from among numerous sets of information in a certain given environment.

In an example, it is possible to recognize and/or detect an object more rapidly and robustly against a change in a scale (or a size as used herein) of a target object by defining a target region to be recognized using an attention point of a user in an input image 110.

This example assumes an environment to which camera image information of a region viewed by the user, for example, the input image 110, and information 120 associated with an attention region or an attention point to which the user pays attention in a corresponding camera image are given.

There is no limitation on a tracking method and a sensor type of an apparatus to obtain the information 120 associated with the attention point of the user, and an object detection method according to an example may be applied as long as the information 120 associated with the attention point of the user is obtainable from the camera image. The attention point may be determined based on at least one of gaze information of the user, voice information of the user, or a gesture performed by the user.

In an example, only an image of a partial region in the entire input image 110 may be extracted using the information 120 associated with the attention point, and a size of an image to be processed when manipulating the input image 110 in operation 130 may be reduced, thereby improving computational efficiency in object recognition. However, when performing the object recognition only using the image of the partial region, object information may not be sufficiently included in the partial region based on a size of a target object to be recognized, and thus a recognition error may be likely to occur. According to an example, such recognition error may be prevented by using a 2-path object recognition structure 140 that may dualize the input image 110 into partial regions including a foveated region and a peripheral region based on a field of view (FoV) using the information 120 associated with the attention point.

For example, when the input image 110 and the information 120 associated with the attention point corresponding to the input image 110 are given, an object detection apparatus according to an example may extract two partial images corresponding to partial regions in the input image 110—a foveated image (hereinafter, F-image) corresponding to a central region of an FoV, and a peripheral image (hereinafter, P-image) corresponding to a peripheral region of the FoV. The object detection apparatus may perform object detection using the 2-path object recognition structure 140 by applying, to neural networks, the two partial images as an input for object recognition. In an example, by dualizing or separating an input image into partial regions of different sizes, it is possible to respond to variability of an object size and improve accuracy in detecting an object.

The 2-path object recognition structure 140 may have a general network architecture for object detection, for example, a deep neural network (DNN), a convolutional neural network (CNN), and a recurrent neural network (RNN), and the like. Respective object recognition neural networks of the two paths in the 2-path object recognition structure 140 may have a same architecture, or individual architectures. When the respective object recognition neural networks of the paths have a same architecture, they may share parameters or weights of the neural networks.

Figure 2:
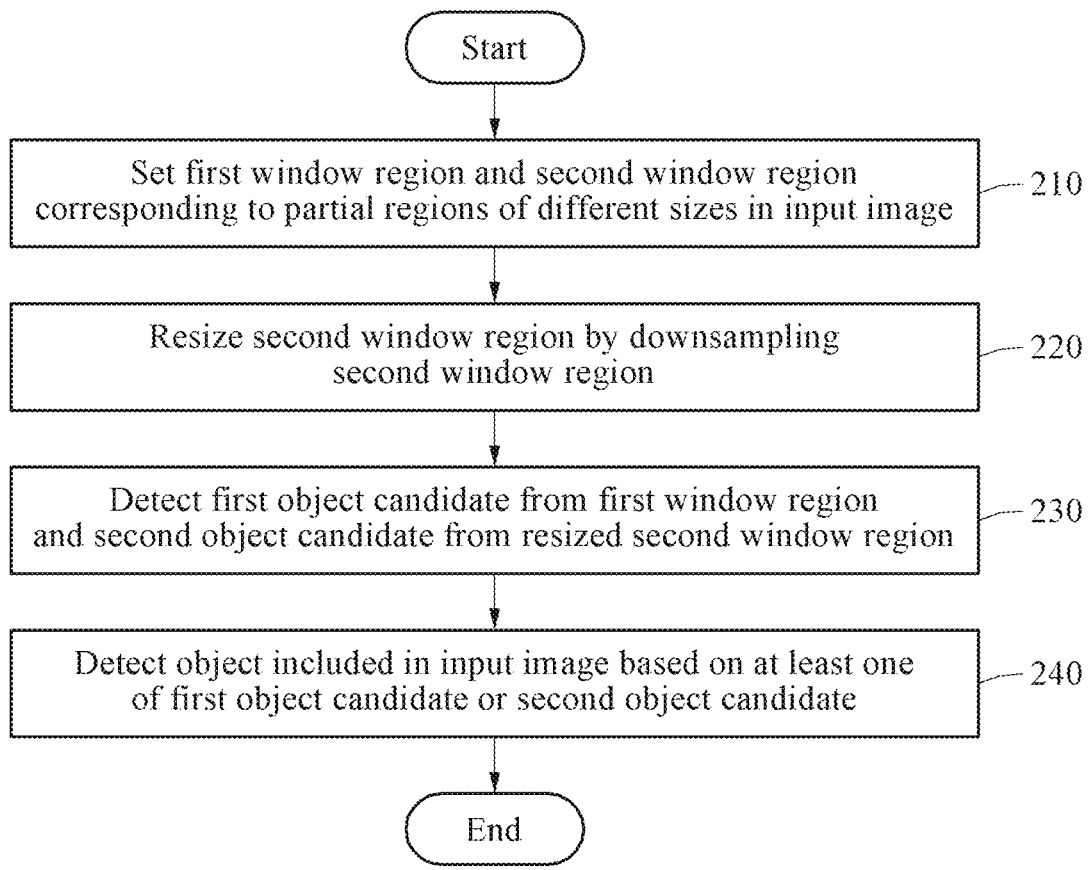
FIG. 2 is a flowchart illustrating an example of an object detection method.

FIG. 2 is a flowchart illustrating an example of an object detection method. The object detection method to be described hereinafter may be performed by an object detection apparatus. Referring to FIG. 2, in operation 210, the object detection apparatus sets a first window region and a second window region corresponding to partial regions of different sizes in an input image. The second window region may be larger than the first window region. The first window region may be used to recognize an object having a size less than a preset size, and corresponds to a foveated region, for example. The second window region may be used to recognize an object having a size greater than the preset size, and corresponds to a peripheral region, for example. The second window region may be set as a region having a broader range for an object that is not covered by the first window region, and thus set to detect a relatively large object.

The preset size described in the foregoing may refer to a size used to distinguish an object of a size that is covered by the first window region and an object of a size that is not covered by the first window region, and may be a 50×50 pixel size, for example.

In an example, the object detection apparatus may set the first window region and the second window region based on an attention point in the input image to which a user pays attention. The attention point may be determined based on at least one of gaze information of the user, voice information of the user, or a gesture performed by the user. For example, when the user gazes at an A point at which a vehicle is located in the input image, the A point at which the gaze of the user stays may be the attention point of the user in the input image. As another example, when the user sets a location in a certain region by voice, for example, by saying "B point at a lower-right corner of the input image," the B point set by voice of the user may be the attention point of the user. As still another example, when the user performs a gesture of pointing at a C point in the input image, the C point set by the gesture may be the attention point of the user.

In operation 210, the object detection apparatus sets the first window region of a first size based on the attention point, and sets the second window region of a second size greater than the first size based on the attention point. Here, information associated with the attention point corresponding to the input image may be obtained along with the input image through a communication interface, for example, a communication interface 1030 to be described with reference to FIG. 10.

In operation 220, the object detection apparatus resizes the second window region by downsampling the second window region. The object detection apparatus may downsample an image corresponding to the second window image to adjust the second size of the second window region to be equal to the first size of the first window size. Hereinafter, how the object detection apparatus sets the first and second window regions, and adjusts a size of the second window region will be described in detail with reference to FIG. 3.

In operation 230, the object detection apparatus detects a first object candidate from the first window region, and a second object candidate from the resized second window region. The object detection apparatus may detect the first object candidate by applying, to a first neural network, a first image extracted from the first window region, and detect the second object candidate by applying, to a second neural network, a second image extracted from the resized second window region. The first neural network and the second neural network may be a same neural network or different neural networks. The first neural network and the second neural network may be neural networks distinguishable from each other, or a single shared neural network. According to an example, the object detection apparatus may detect the first object candidate and the second object candidate simultaneously, or detect the second object candidate after detecting the first object candidate. Alternatively, the object detection apparatus may detect the first object candidate after detecting the second object candidate. In such case, the object detection apparatus may detect the first object candidate based on whether the second object candidate is detected from the resized second window region. Hereinafter, examples of the foregoing will be described with reference to FIG. 5.

In operation 240, the object detection apparatus detects an object included in the input image based on at least one of the first object candidate or the second object candidate. The object detection apparatus may detect the object included in the input image from at least one of the first object candidate or the second object candidate using non-maximum suppression (NMS), for example. The NMS may be a post-processing method that is used to remove a redundant, less accurate result when multiple bounding boxes or windows of different sizes are detected, and maintain only a final result. The NMS may be used to detect an object using deep learning by removing an overlapping region based on a probability of an object being present in a bounding box or a window region, or a probability for each class, and finally detect an object.

Figure 3:
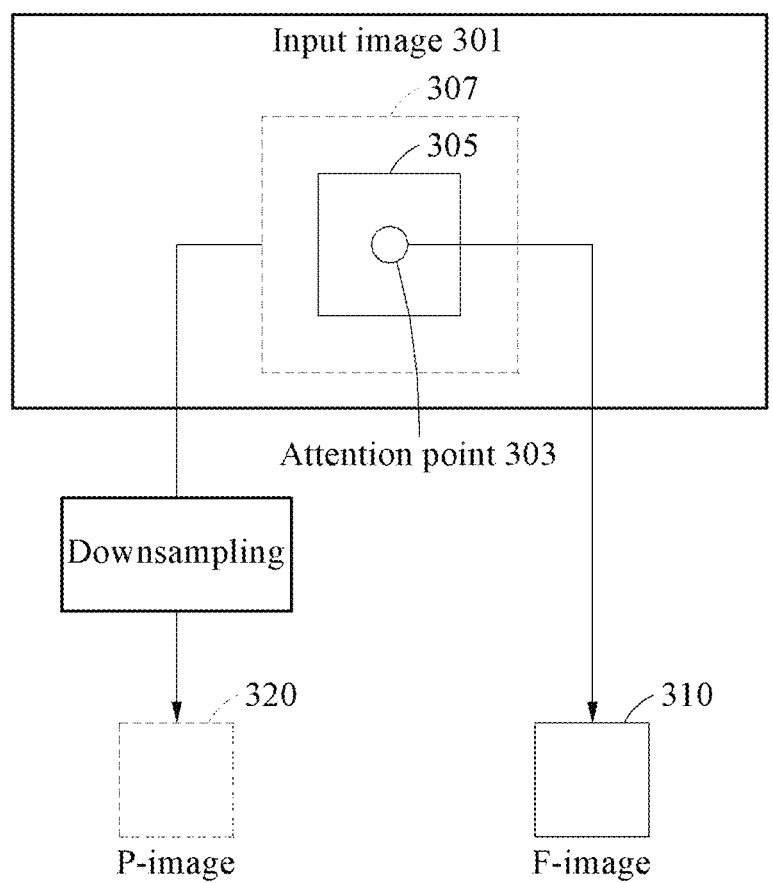
FIG. 3 is a diagram illustrating an example of setting a first window region and a second window region.

FIG. 3 is a diagram illustrating an example of setting a first window region and a second window region. FIG. 3 includes an input image 301, an attention point 303 of a user in the input image 301, a first window region 305, a second window region 307, an F-image 310, and a P-image 320. In this example, the F-image 310 may also be referred to as a first image, and the P-image 320 may also be referred to as a second image.

In an example, when the input image 301 and information associated with the attention point 303 corresponding to the input image 301 are given, an object detection apparatus sets two window regions of different sizes—the first window region 305 and the second window region 307—based on the attention point 303 of the user. For example, the object detection apparatus sets the first window region 305 and the second window region 307 of different sizes based on the attention point 303 of the user corresponding to the input image 301.

The first window region 305 may be for recognizing an object having a size less than a preset size, and correspond to a foveated region. The preset size may change based on a general size of a type of an object to be recognized and/or detected. The F-image 310 may be extracted from the first window region 305, and a size of the F-image 310 may be 50×50 pixels, for example. The F-image 310 extracted from the first window region 305 may have a same resolution as the input image 301. The F-image 301 to be used to recognize a relatively small object may maintain the same resolution as the input image 301, and thus improve accuracy in object detection without a data loss that may be caused by downsampling the entire input image 301.

The second window region 307 may be for recognizing an object having a size greater than the preset size, and correspond to a peripheral region. The P-image 320 may be extracted from the second window region 307. The P-image 320 extracted from the second window region 307 may have a resolution lower than that of the input image 301, and a size of the P-image 320 may be 350×350 pixels, for example.

In an example, the object detection apparatus may set the second window region 307 to have a size greater than that of the first window region 305, and downsample an image corresponding to the second window region 307 to have a same size as the F-image 310 before inputting the image to a neural network, and thus allow the P-image 320 and the F-image 310 to share a base network for object detection. In this example, the P-image 320 may be a resized image obtained by resizing, to be small, an image including a relatively large object, and thus may contribute to reducing a computational load of the neural network.

However, according to an example, the size of the P-image 320 and the size of the F-image 310 may not necessarily be the same, and the sizes may be adjusted in various ways as needed.

In an example, a size of a window region may be determined based on, for example, a type of an object to be detected from an input image based on a technical field of application, an FoV, and camera distance information corresponding to the input image.

For example, in a situation where a vehicle on a road is to be recognized by an augmented reality head-up display (AR HUD) or through augmented reality (AR) glasses, and a vehicle object is included within a window region of a 50×50 pixel size in a distance of 20 meters (m) on average, a size of a first window region may be set to be 50×50 pixels. In this example, when a readable FoV is 20° and a binocular FoV is 120°, and a ratio therebetween is 1:6, the P-image 320 of a 350×350 pixel size may be extracted, and then resized to be of a 50×50 pixel size. Subsequently, the F-image 310 and the P-image 320 may be applied as an input to a base network as illustrated in FIG. 4, and be used for inference for object recognition and/or object detection.

Figure 4:
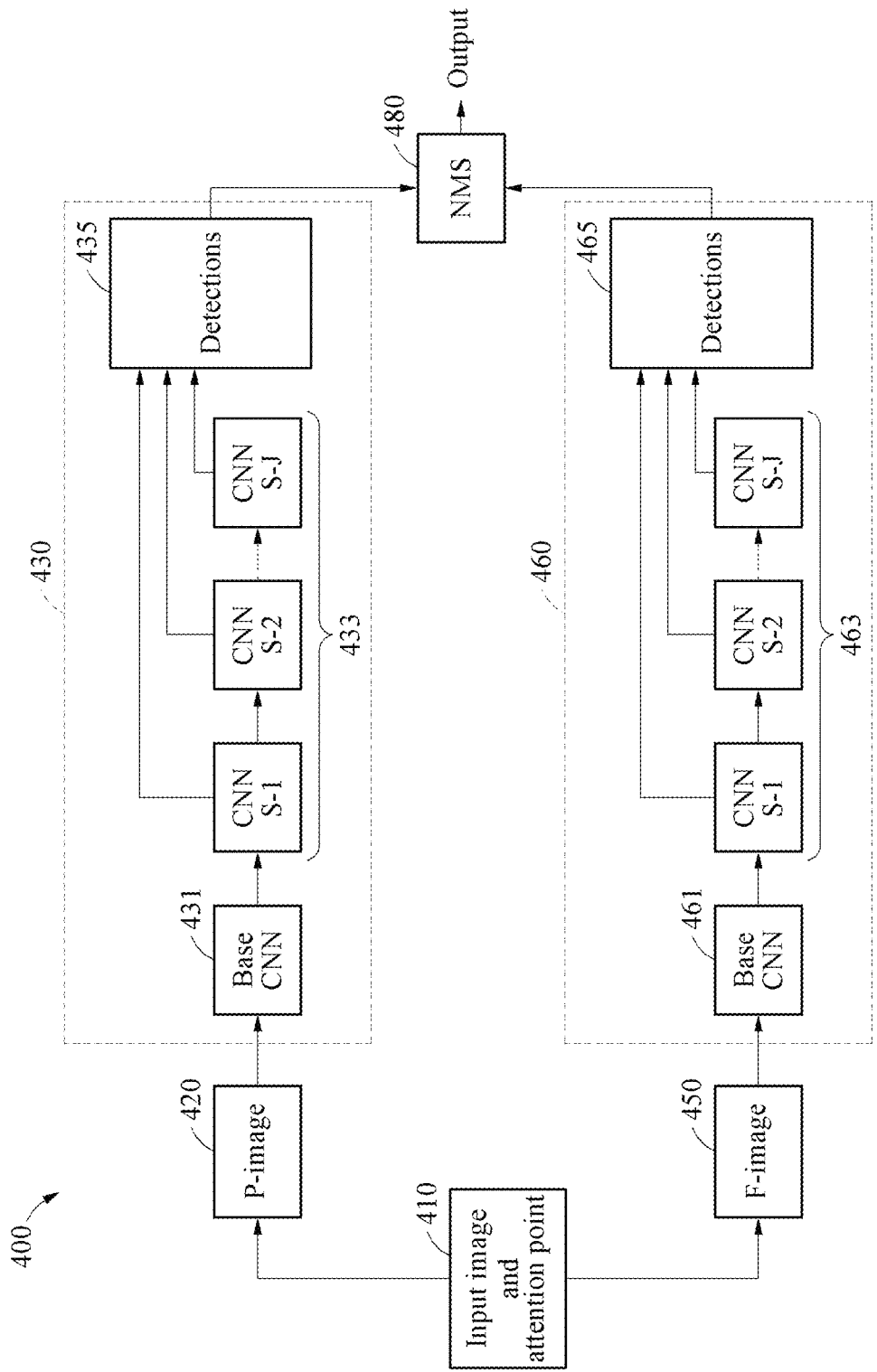
FIG. 4 is a diagram illustrating an example of a network architecture of an object detection apparatus.

FIG. 4 is a diagram illustrating an example of a network architecture of an object detection apparatus. Referring to FIG. 4, an object detection apparatus 400 includes a P-image 420, a first neural network 430, an F-image 450, a second neural network 460, and a third detector 480.

The first neural network 430 includes a base network 431, first feature extraction layers 433, and a first detector 435. The second neural network 460 includes a base network 461, second feature extraction layers 463, and a second detector 465.

The first feature extraction layers 433 may be, for example, convolutional layers, or feature layers of a single shot multibox detector (SSD). The second feature extraction layers 463 may also be, for example, convolutional layers or feature layers of an SSD. The object detection apparatus 400 may receive an input image and information associated with an attention point corresponding to the input image 410. The object detection apparatus 400 may also receive information associated with a size of a first window region, for example, 50×50 pixels. The object detection apparatus 400 may extract the P-image 420 and the F-image 450 from the input image through a method described above with reference to FIG. 3.

The P-image 420 and the F-image 450 may be applied as an input to the neural networks 430 and 460, respectively, to extract features, and a feature map result may be output. As illustrated in FIG. 4, the object detection apparatus 400 applies the P-image 420 to the first neural network 430, and detects a first object candidate through the first detector 435. The first detector 435 may receive outputs of the first feature extraction layers 433, and predict bounding box coordinate-related information for each cell of a feature map, and a class probability.

The object detection apparatus 400 applies the F-image 450 to the second neural network 460, and detects a second object candidate through the second detector 465. The second detector 465 may receive outputs of the second feature extraction layers 463, and predict bounding box coordinate-related information for each cell of a feature map, and a class probability.

In this example, any algorithms, or structures or architectures for object recognition and/or object detection may be used as an architecture of the base network 431 of the first neural network 430 and the base network 461 of the second neural network 460.

The third detector 480 may detect an object by removing an overlapping region from the first object candidate and the second object candidate through NMS.

Although, in the example of FIG. 4, the object detection apparatus 400 includes neural networks distinguishable from each other, for example, the second neural network 460 and the first neural network 430, for the F-image 450 and the P-image 420, respectively, examples are not limited to the illustrated example. Alternatively, the object detection apparatus 400 may detect an object by a single shared neural network. In such example, the object detection apparatus 400 may detect a first object candidate by applying, to the neural network, a first image extracted from a first window region, and detect a second object candidate by applying, to the neural network, a second image extracted from a resized second window region, and then finally detect an object by removing an overlapping region from the first object candidate and the second object candidate.

Figure 5:
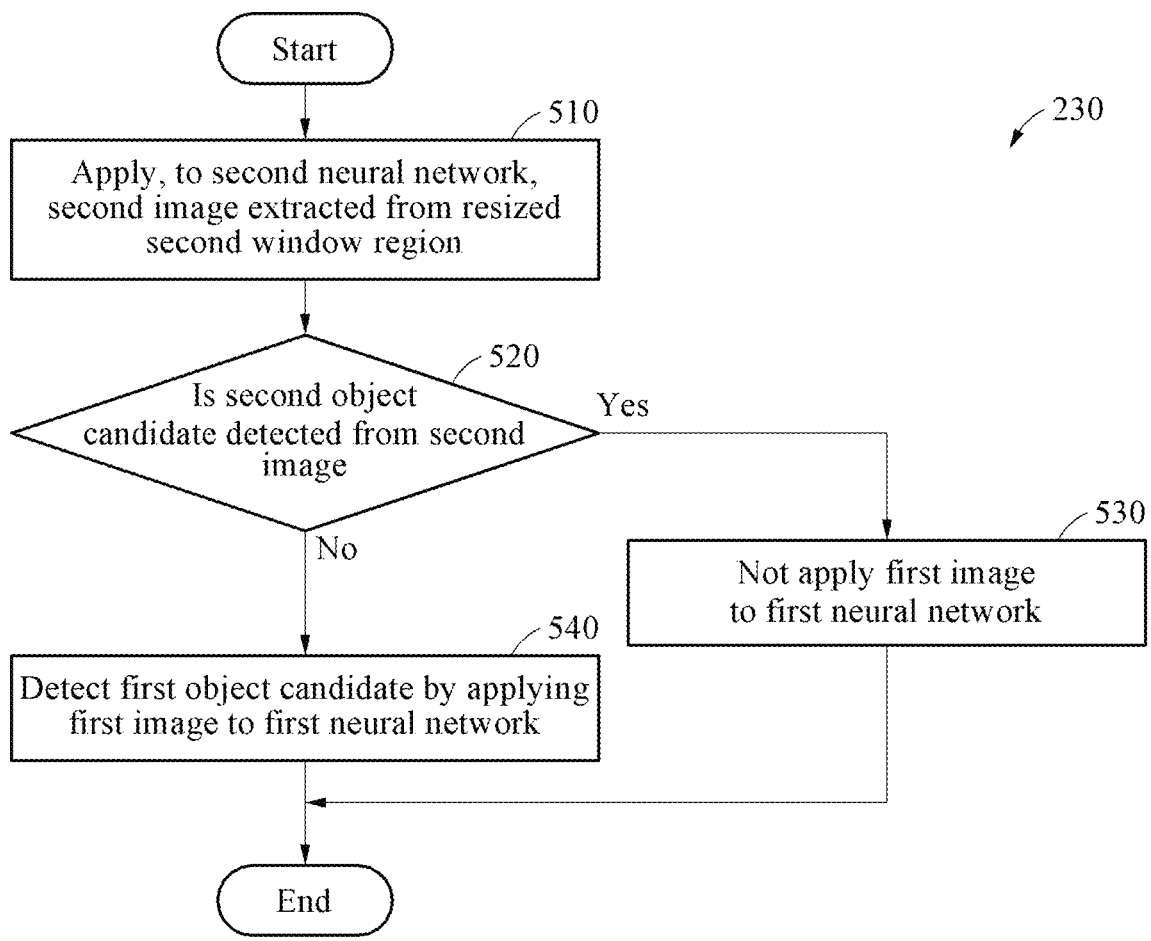
FIGS. 5 and 6 are flowcharts illustrating examples of detecting a first object candidate and a second object candidate.

FIG. 5 is a flowchart illustrating an example of detecting a first object candidate and a second object candidate. Referring to FIG. 5, in operation 510, an object detection apparatus applies, to a second neural network, a second image extracted from a resized second window region. In operation 520, the object detection apparatus determines whether a second object candidate is detected from the second image. In operation 530, when the second object candidate is detected in operation 520, the object detection apparatus terminates an operation without applying a first image to a first neural network.

In operation 540, when the second object candidate is not detected in operation 520, the object detection apparatus detects a first object candidate by applying the first image to the first neural network.

Figure 6:
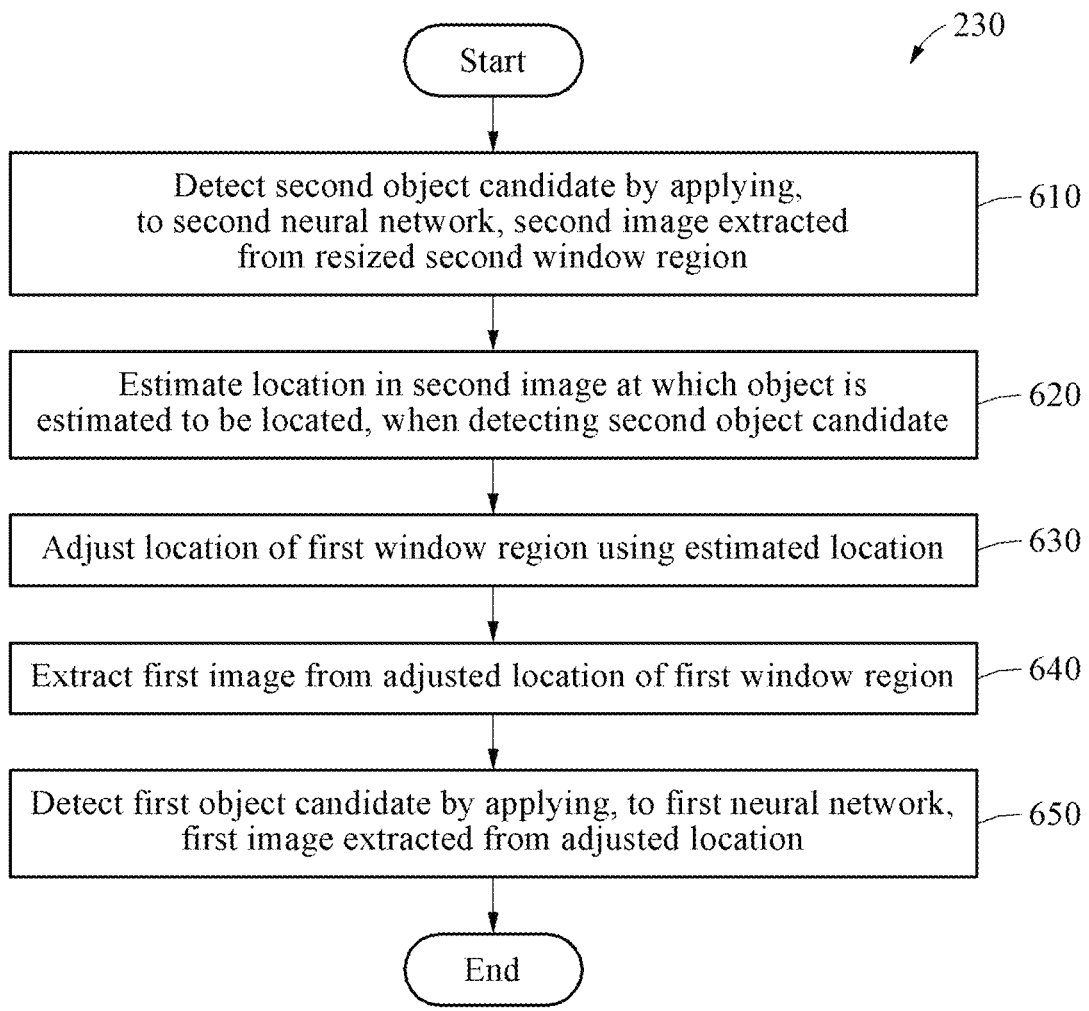

FIG. 6 is a flowchart illustrating another example of detecting a first object candidate and a second object candidate (for example, operation 230 in FIG. 2). Referring to FIG. 6, in operation 610, an object detection apparatus detects a second object candidate by applying, to a second neural network, a second image extracted from a resized second window region.

In operation 620, when detecting the second object candidate, the object detection apparatus estimates a location in the second image at which an object is estimated to be located.

In operation 630, the object detection apparatus adjusts a location of a first window region using the estimated location.

In operation 640, the object detection apparatus extracts a first image from the adjusted location of the first window region.

In operation 650, the object detection apparatus detects a first object candidate by applying, to a first neural network, the first image extracted from the adjusted location.

Figure 7:
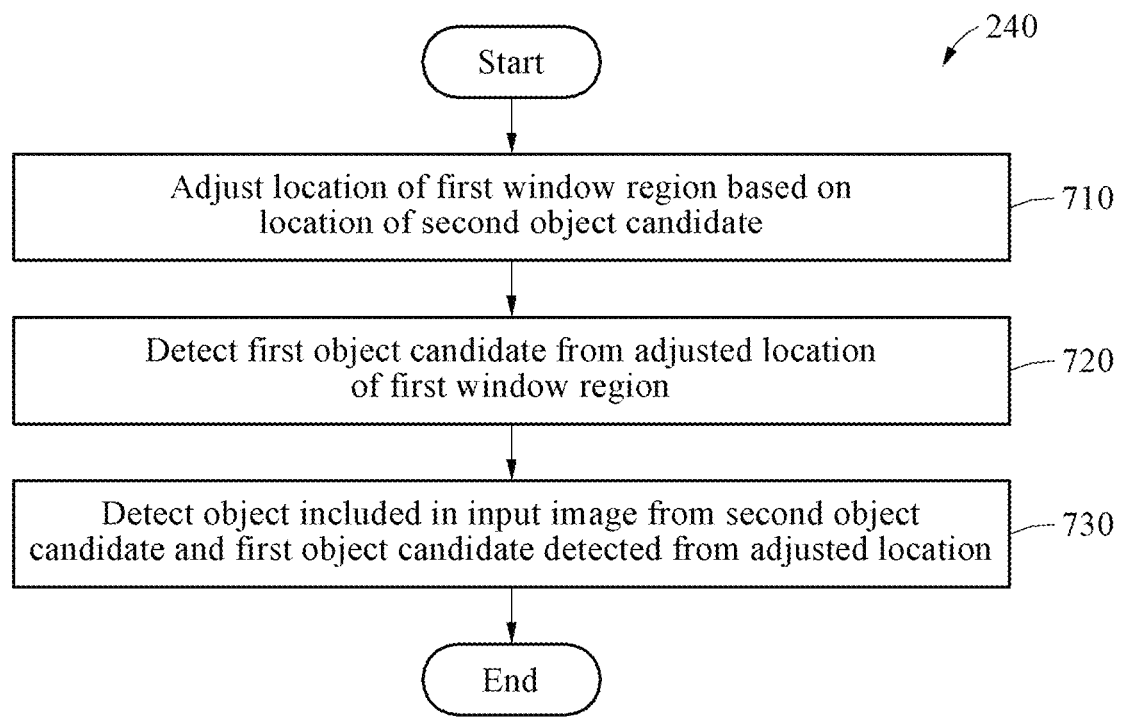
FIG. 7 is a flowchart illustrating an example of detecting an object.

FIG. 7 is a flowchart illustrating an example of detecting an object (for example, operation 240 in FIG. 2). Referring to FIG. 7, in operation 710, an object detection apparatus adjusts a location of a first window region based on a location of a second object candidate. For example, the object detection apparatus may estimate a location in an input image at which an object is estimated to be located based on the location of the second object candidate, and adjust the location of the first window region using the estimated location.

In operation 720, the object detection apparatus detects a first object candidate from the adjusted location of the first window region.

In operation 730, the object detection apparatus detects an object included in the input image from the second object candidate and the first object candidate detected from the adjusted location. In the example of FIG. 7, the object detection apparatus may use NMS to detect the object included in the input image from the second object candidate and the first object candidate detected from the adjusted location.

Figure 8:
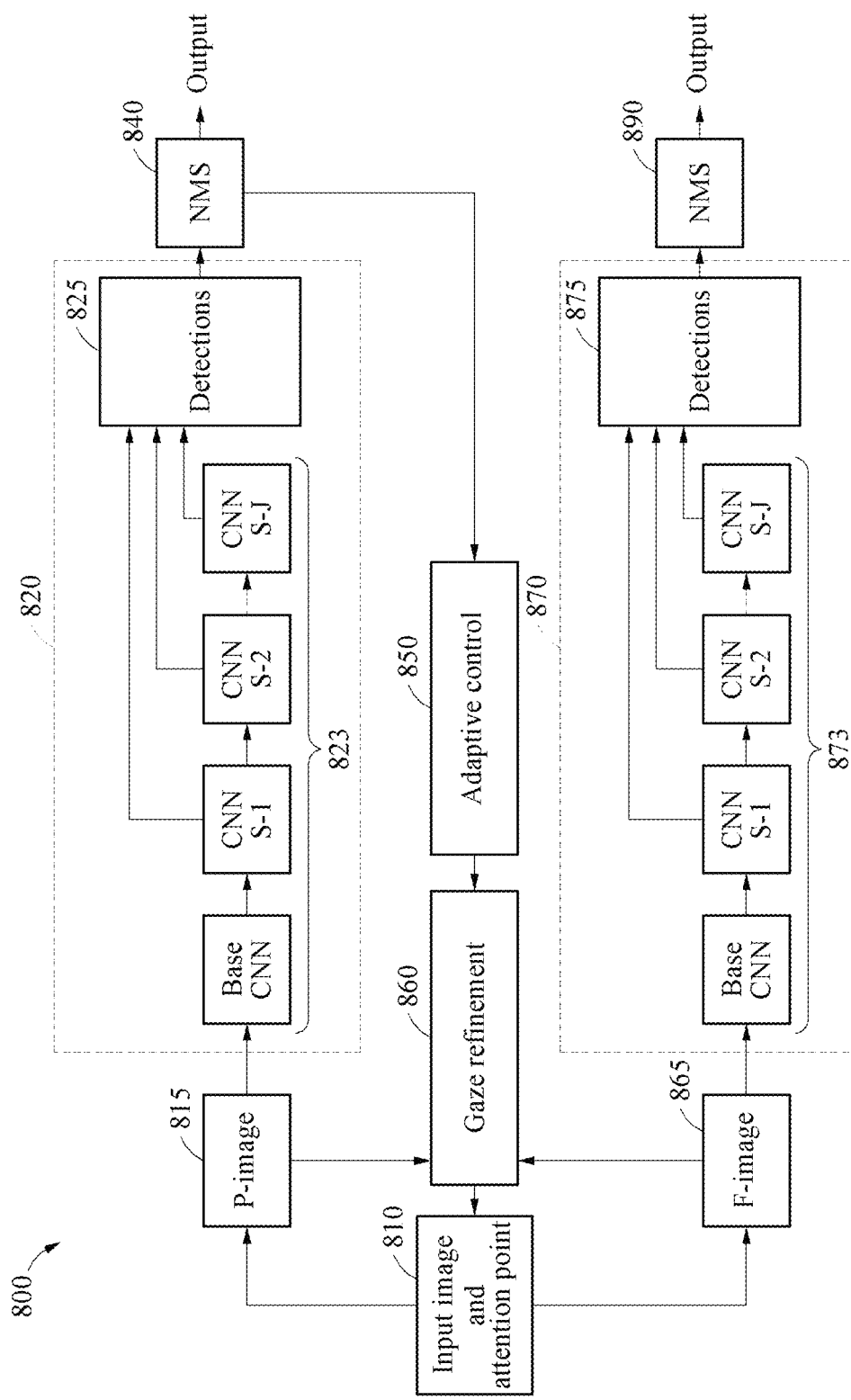
FIG. 8 is a diagram illustrating another example of a network architecture of an object detection apparatus.

FIG. 8 is a diagram illustrating another example of a network architecture of an object detection apparatus. In the example of FIG. 8, an object detection apparatus 800 has a network architecture to which an adaptive controller 850 and a gaze refiner 860 are added, compared to the network architecture illustrated in FIG. 4, to improve computational efficiency and accuracy.

Referring to FIG. 8, a first neural network 820 includes a portion 823 including a base network and first feature extraction layers, and a first detector 825. A second neural network 870 also includes a portion 873 including a base network and second feature extraction layers, and a second detector 875. The object detection apparatus 800 may receive an input image and information associated with an attention point corresponding to the input image 810.

The first neural network 820 and the second neural network 870 are respectively identical to the first neural network 430 and the second neural network 460 of FIG. 4, and thus a detailed description of them will be omitted here and reference may be made to FIG. 4. Hereinafter, only a difference from the network architecture described above with reference to FIG. 4 will be described.

For example, as illustrated, when an object having a size greater than a preset size, for example, a 50×50 pixel size, is detected from a P-image 815, an F-image 865 is filled with the object because the F-image 865 is smaller than the P-image 815 in size. In this example, a process or operation needed to detect a small object may not need to be performed, and thus a computation or operation to detect an object from the F-image 865 may be omitted and an object candidate detected from the P-image 815 may be output as a final detection result through the third detector 840.

The adaptive controller 850 may determine whether to detect an object from the F-image 865 based on whether an object candidate is detected from the P-image 815. When the object candidate is not detected from the P-image 815 even though the P-image 815 is applied to the first neural network 820, the adaptive controller 850 may apply the F-image 865 to the second neural network 870 to detect an object candidate, and output the object candidate detected from the F-image 865 as a final detection result through a fourth detector 890. However, when the object candidate is detected from the P-image 815, the adaptive controller 850 may not apply the F-image 865 to the second neural network 870.

Hereinafter, an example of how the gaze refiner 860 adjusts a location of a window region based on an estimated gaze location will be provided for convenience of description. However, examples are not limited to the example to be described hereinafter. For example, an attention point determined based on various sets of information about, for example, voice and gestures, in addition to a gaze, may be used to detect an object.

In an example, whether an error is included in a result of tracking a gaze of a user may depend on accuracy of a gaze sensor. For example, in a case of a small object, a gaze point may not be located on the object. In such case, the gaze refiner 860 may be used to improve accuracy in tracking a gaze point.

When detecting an object candidate using the P-image 815, the gaze refiner 860 may estimate a location at which a small object is estimated to be located. The gaze refiner 860 may adjust a location of a first window region in the input image using the estimated location, and extract the F-image 865 from the adjusted location of the first window region. To estimate a location of a small object in the P-image 815, various methods may be used.

According to an example, the object detection apparatus 800 may detect a small object in the P-image 815 by learning or training a regression CNN using a small object detection DB having a ground truth for gaze annotation of a user.

Although the adaptive controller 850 and the gaze refiner 860 are illustrated together in FIG. 8, they may not need to necessarily operate together, and one of the two may be selectively used.

Figure 9:
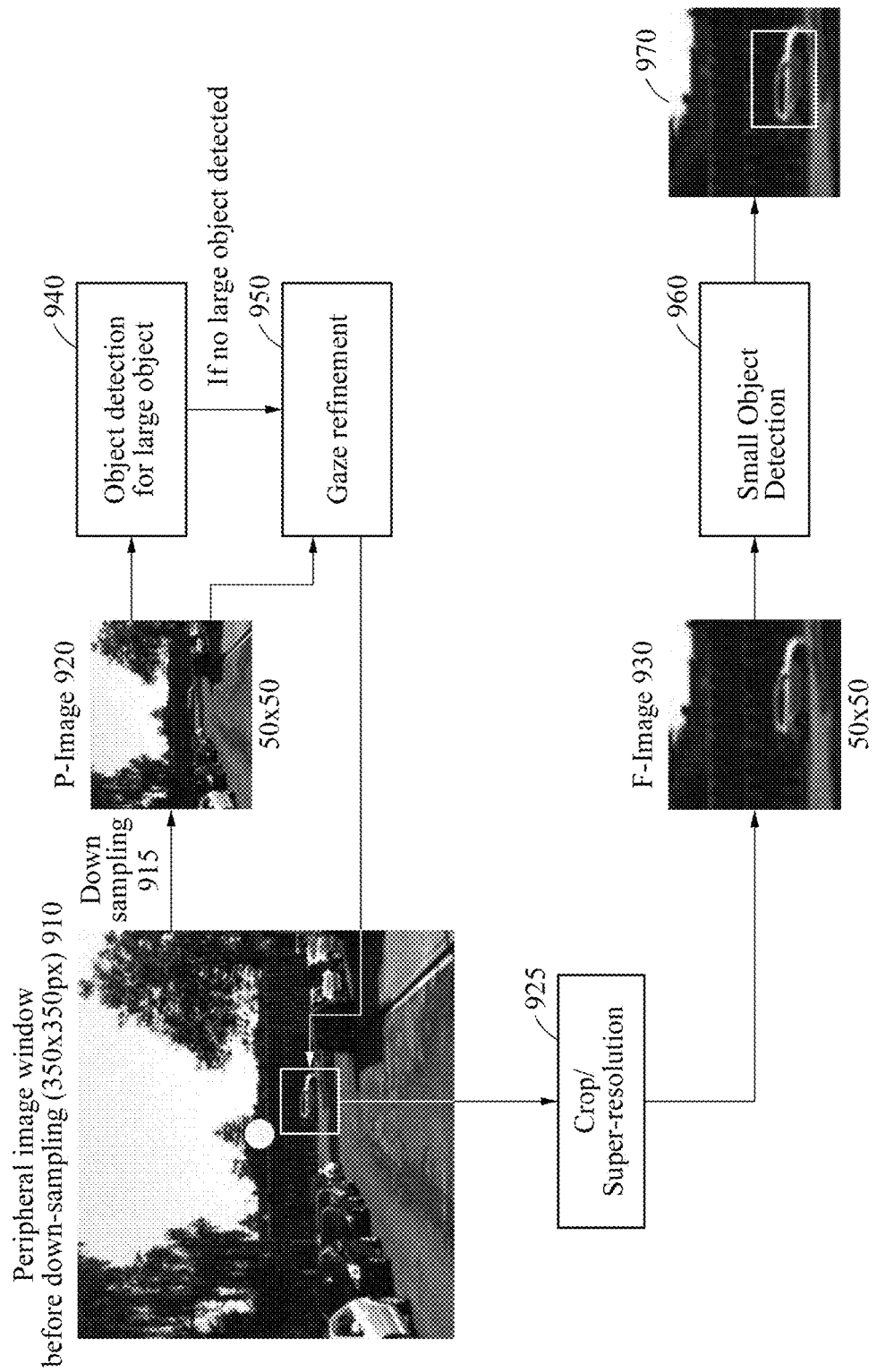
FIG. 9 is a diagram illustrating an example of detecting an object from an input image.

FIG. 9 is a diagram illustrating an example of detecting an object from an input image. Referring to FIG. 9, in operation 915, an object detection apparatus downsamples a second window region having a 350×350 pixel size in an input image 910 to resize the second window region to have a 50×50 pixel size. The second window region may be used to recognize an object having a size greater than a preset size.

The object detection apparatus then extracts a P-image 920 from the resized second window region having the 50×50 pixel size. In operation 940, the object detection apparatus detects an object candidate having a relatively great size from the P-image 920. When the object candidate is detected in operation 940, the object detection apparatus outputs the detected object candidate as a finally detected object.

In operation 950, when the object candidate is not detected in operation 940, the object detection apparatus performs gaze refinement on the P-image 920. The object detection apparatus adjusts a location of a first window region, which is used to recognize an object having a relatively small size, based on a location of the second window region. The object detection apparatus obtains an F-image 930 from the adjusted location of the first window region through cropping to have a 50×50 pixel size. The object detection apparatus may apply super-resolution 925 to improve a resolution of the cropped F-image 930.

The object detection apparatus detects a small object from the F-image 930 in operation 960, and finally detects an object in operation 970.

Figure 10:
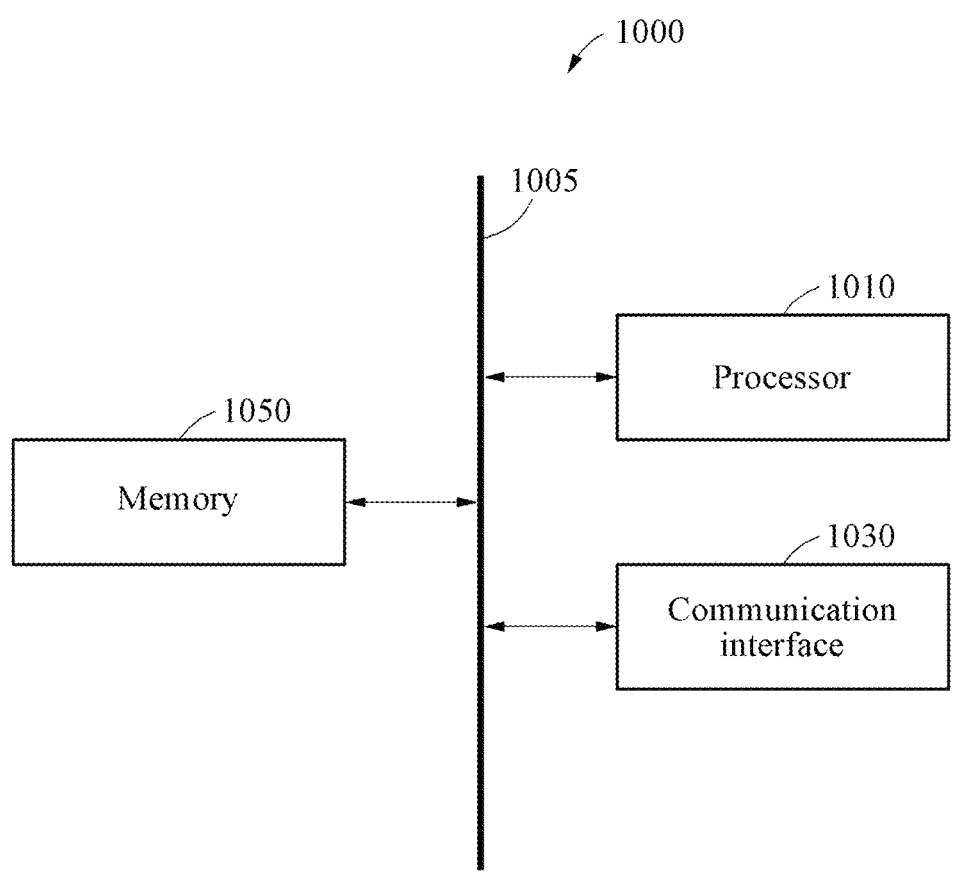
FIG. 10 is a diagram illustrating an example of an object detection apparatus.

FIG. 10 is a diagram illustrating an example of an object detection apparatus. Referring to FIG. 10, an object detection apparatus 1000 includes a processor 1010 and a communication interface 1030. The object detection apparatus 1000 further includes a memory 1050. The processor 1010, the communication interface 1030, and the memory 1050 may communication with one another through a communication bus 1005.

The processor 1010 may set a first window region and a second window region corresponding to partial regions of different sizes in an input image. The second window region may be larger than the first window region. The processor 1010 may resize the second window region by downsampling the second window region. The processor 1010 may detect a first object candidate from the first window region, and detect a second object candidate from the resized second window region. The processor 1010 may detect an object included in the input image based on at least one of the first object candidate or the second object candidate.

The communication interface 1030 may obtain the input image. The communication interface 1030 may obtain an attention point corresponding to the input image.

The memory 1050 may store the input image obtained through the communication interface 1030. The memory 1050 may store a first size of the first window region, and a second size of the second window region. The memory 1050 may store the first object candidate and the second object candidate that are detected by the processor 1010.

The processor 1010 may perform at least one of the methods and operations described above with reference to FIGS. 1 through 9, and algorithms corresponding to the at least one method and operation. The processor 1010 may be a data processing apparatus embodied by hardware having a circuit of a physical structure to execute desired operations. The desired operations may include, for example, codes or instructions included in a program. The data processing apparatus embodied by hardware may include, for example, a microprocessor, a central processing unit (CPU), a processor core, a multi-core processor, a multiprocessor, an application-specific integrated circuit (ASIC), and a field-programmable gate array (FPGA).

The processor 1010 may execute the program, and control the object detection apparatus 1000. A code of the program executed by the processor 1010 may be stored in the memory 1050.

The memory 1050 may store various sets of information generated when the processor 1010 performs the operations and methods described above. The memory 1050 may also store various sets of data and programs. The memory 1050 may include a volatile memory or a nonvolatile memory. The memory 1050 may include a mass storage medium, for example, a hard disk, to store the various sets of data.

The object detection apparatus, and other apparatuses, units, modules, devices, and components described herein with respect to FIGS. 4, 8, and 10 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-3, 5-7, and 9 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An object detection method comprising:
    setting a first window region and a second window region corresponding to partial regions of different sizes in an input image, wherein the second window region is larger than the first window region;
    downsampling the second window region to generate a resized second window region;
    detecting a first object candidate from the first window region and a second object candidate from the resized second window region; and
    detecting an object included in the input image based on one or both of the first object candidate and the second object candidate, the detecting of the object including removing an overlapping region from the first object candidate and the second object candidate based on a probability of the object being present in the first window region and/or the resized second window region,
    wherein the detecting of the first object candidate and the second object candidate comprises:
    in a case in which the second object candidate is not detected in a second image extracted from the resized second window region, detecting the first object candidate by applying a first image extracted from the first window region to a first neural network, and
    wherein the detecting of the object comprises:
    adjusting a location of the first window region based on a location of the second object candidate;
    detecting the first object candidate from the adjusted location of the first window region; and
    detecting the object included in the input image from the second object candidate and the first object candidate detected from the adjusted location.

2. The object detection method of claim 1, wherein the setting of the first window region and the second window region comprises:
    setting the first window region and the second window region based on an attention point of a user in the input image.

3. The object detection method of claim 2, further comprising determining the attention point based on one or more of gaze information of the user, voice information of the user, and a gesture performed by the user.

4. The object detection method of claim 3, wherein the setting of the first window region and the second window region comprises:

setting the first window region of a first size based on the attention point; and setting the second window region of a second size greater than the first size based on the attention point.

5. The object detection method of claim 1, wherein the downsampling of the second window region comprises:

adjusting a second size of the second window region to be equal to a first size of the first window region by downsampling an image corresponding to the second window region.

6. The object detection method of claim 5, wherein the first size of the first window region and the second size of the second window region are determined based on one or more of a type of the object to be detected from the input image, a field of view (FoV), and camera distance information corresponding to the input image.

7. The object detection method of claim 1, wherein the first window region is configured to recognize an object having a size less than a preset size, and a first image extracted from the first window region has a same resolution as the input image.

8. The object detection method of claim 1, wherein the second window region is configured to recognize an object having a size greater than a preset size, and the second image extracted from the resized second window region has a resolution lower than a resolution of the input image.

9. The object detection method of claim 1, wherein the detecting of the object comprises:

detecting the object included in the input image from one or both of the first object candidate and the second object candidate using non-maximum suppression (NMS).

10. The object detection method of claim 1, wherein the detecting of the first object candidate and the second object candidate comprises:

detecting the first object candidate based on whether the second object candidate is detected from the resized second window region.

11. The object detection method of claim 1, wherein the adjusting of the location of the first window region comprises:

estimating a location in the input image at which the object is estimated to be located based on the location of the second object candidate; and adjusting the location of the first window region using the estimated location.

12. The object detection method of claim 1, wherein the detecting of the first object candidate and the second object candidate comprises:

detecting the second object candidate by applying, to a second neural network, the second image extracted from the resized second window region; and detecting the first object candidate by applying, to the first neural network, the first image extracted from the first window region.

13. The object detection method of claim 1, wherein the detecting of the first object candidate and the second object candidate comprises:

determining whether the second object candidate is detected from the second image extracted from the resized second window region by applying the second image to the second neural network; and determining whether to apply a first image extracted from the first window region to the first neural network to detect the first object candidate based on whether the second object candidate is detected from the second image.

14. The object detection method of claim 13, further comprising:

in a case in which the second object candidate is detected from the second image, not applying the first image to the first neural network.

15. The object detection method of claim 1, wherein the detecting of the first object candidate comprises:

estimating a location in the second image at which the object is estimated to be located;

adjusting a location of the first window region using the estimated location;

extracting the first image from the adjusted location of the first window region; and detecting the first object candidate by applying, to the first neural network, the first image extracted from the adjusted location.

16. The object detection method of claim 1, further comprising obtaining the input image and an attention point corresponding to the input image.

17. A non-transitory computer-readable storage medium storing instructions that, when executed by one or more processors, cause the one or more processors to perform the object detection method of claim 1.

18. An object detection apparatus comprising:

a communication interface configured to obtain an input image; and a processor configured to:

set a first window region and a second window region larger than the first window region that correspond to partial regions of different sizes in the input image;

downsample the second window region to generate a resized second window region;

detect a first object candidate from the first window region and a second object candidate from the resized second window region; and detect an object included in the input image based on one or both of the first object candidate and the second object candidate, wherein the processor is configured to:

for the detecting of the object, remove an overlapping region from the first object candidate and the second object candidate based on a probability of the object being present in the first window region and/or the resized second window region; and in a case in which the second object candidate is not detected in a second image extracted from the resized second window region, detect the first object candidate by applying a first image extracted from the first window region to a first neural network, and wherein the detecting of the object comprises:

adjusting a location of the first window region based on a location of the second object candidate;

detecting the first object candidate from the adjusted location of the first window region; and detecting the object included in the input image from the second object candidate and the first object candidate detected from the adjusted location.

19. The object detection apparatus of claim 18, wherein the processor is configured to:

set the first window region and the second window region based on an attention point of a user in the input image.

20. The object detection apparatus of claim 19, wherein the attention point is determined based on one or more of gaze information of the user, voice information of the user, and a gesture performed by the user.

21. The object detection apparatus of claim 20, wherein the processor is configured to:
set the first window region of a first size based on the attention point; and
set the second window region of a second size greater than the first size based on the attention point.

22. The object detection apparatus of claim 18, wherein the processor is configured to:
adjust a second size of the second window region to be equal to a first size of the first window region by downsampling an image corresponding to the second window region.

23. The object detection apparatus of claim 22, wherein the first size of the first window region and the second size of the second window region are determined based on one or more of a type of the object to be detected from the input image, a field of view (FoV), and camera distance information corresponding to the input image.

24. The object detection apparatus of claim 18, wherein the first window region is configured to recognize an object having a size less than a preset size, and
a first image extracted from the first window region has a same resolution as the input image.

25. The object detection apparatus of claim 18, wherein the second window region is configured to recognize an object having a size greater than a preset size, and
the second image extracted from the resized second window region has a resolution lower than a resolution of the input image.

26. The object detection apparatus of claim 18, wherein the processor is configured to:
detect the object included in the input image from one or both of the first object candidate and the second object candidate using non-maximum suppression (NMS).

27. The object detection apparatus of claim 18, wherein the processor is configured to:
detect the first object candidate based on whether the second object candidate is detected from the resized second window region.

28. The object detection apparatus of claim 18, wherein the processor is configured to:
estimate a location in the input image at which the object is estimated to be located based on the location of the second object candidate; and
adjust the location of the first window region using the estimated location.

29. The object detection apparatus of claim 18, wherein the processor is configured to:
determine whether the second object candidate is detected from a second image extracted from the resized second window region by applying the second image to a second neural network; and
determine whether to apply the first image extracted from the first window region to the first neural network to detect the first object candidate based on whether the second object candidate is detected from the second image.

30. The object detection apparatus of claim 29, wherein the processor is configured to:
in a case in which the second object candidate is detected from the second image, not apply the first image to the first neural network.

31. The object detection apparatus of claim 18, wherein the processor is configured to:
estimate a location in the second image at which the object is estimated to be located;
adjust a location of the first window region using the estimated location;
extract the first image from the adjusted location of the first window region; and
detect the first object candidate by applying, to the first neural network, the first image extracted from the adjusted location.

32. The object detection apparatus of claim 18, wherein the communication interface is configured to obtain an attention point corresponding to the input image.

33. An object detection apparatus comprising:
a communication interface configured to obtain an input image; and
a processor configured to:
set a first window region of a first size and a second window region of a second size larger than the first size corresponding to partial regions of the input image;
generate a resized second window region from the second window region;
determine whether a second object candidate is detected from a second image extracted from the resized second window region by applying the second image to a second neural network;
determine whether to apply a first image extracted from the first window region to a first neural network to detect a first object candidate based on whether the second object candidate is detected from the second image; and
detect an object included in the input image based on one or both of the first object candidate and the second object candidate,
wherein the processor is configured to:
for the detecting of the object, remove an overlapping region from the first object candidate and the second object candidate based on a probability of the object being present in the first window region and/or the resized second window region; and
in a case in which the second object candidate is not detected in the second image, detect the first object candidate by applying the first image to the first neural network, and
wherein the detecting of the object comprises:
adjusting a location of the first window region based on a location of the second object candidate;
detecting the first object candidate from the adjusted location of the first window region; and
detecting the object included in the input image from the second object candidate and the first object candidate detected from the adjusted location.

34. The object detection apparatus of claim 33, wherein the processor is configured to:
in a case in which the second object candidate is detected from the second image, not apply the first image to the first neural network.

* * * * *